(12) United States Patent
Blanche (10) Patent No.: US 12,044,948 B2
(45) Date of Patent: Jul. 23, 2024

(54) EXPANSION OF ANGULAR DISTRIBUTION OF A LIGHT BEAM TO COVER A SOLID ANGLE OF UP TO 4pi STERADIANS

(71) Applicant: Arizona Board of Regents on behalf of the University of Arizona, Tucson, AZ (US)

(72) Inventor: Pierre Alexandre Blanche, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 1004 days.

(21) Appl. No.: 17/000,817

(22) Filed: Aug. 24, 2020

(65) Prior Publication Data

US 2020/0387043 A1 Dec. 10, 2020

Related U.S. Application Data

(63) Continuation of application No. PCT/US2019/019389, filed on Feb. 25, 2019.

(60) Provisional application No. 62/635,804, filed on Feb. 27, 2018.

(51) Int. Cl.
*G02F 1/29* (2006.01)
*G02B 5/32* (2006.01)
*G01S 7/481* (2006.01)

(52) U.S. Cl.
CPC .............. *G02F 1/292* (2013.01); *G02B 5/32* (2013.01); *G01S 7/4817* (2013.01); *G02F 2203/24* (2013.01); *G02F 2203/50* (2013.01)

(58) Field of Classification Search
CPC ............... G02B 5/32; G02B 27/0103; G02B 27/0944; G02B 2027/0105; G02B 2027/0174; G03H 2270/21; G03H 2270/55; G02F 1/292; G02F 2203/24; G02F 2203/50
See application file for complete search history.

(56) References Cited

U.S. PATENT DOCUMENTS

2018/0373044 A1* 12/2018 Alexander ............. G02B 6/005

* cited by examiner

*Primary Examiner* — Joseph P Martinez
(74) *Attorney, Agent, or Firm* — Quarles & Brady LLP; Yakov Sidorin (57) ABSTRACT

A static optical system, for use with a phase modulator, configured to expand (at least up to 4π steradian) the solid angle range within which a light beam can propagate from and after interacting with the phase modulator. A specific embodiment includes a first holographic disperser (a layer with at least one hologram recorded therein, a lens element configured as a large spherical cap, and a second holographic disperser (a layer with at least one hologram in it) shaped as a shell against second optical surface of the lens element. Holographic dispersers carry/contain angularly-selective multiplexed volume holograms.

20 Claims, 6 Drawing Sheets

EXPANSION OF ANGULAR DISTRIBUTION OF A LIGHT BEAM TO COVER A SOLID ANGLE OF UP TO 4pi STERADIANS

CROSS-REFERENCE TO RELATED APPLICATIONS

The present application is a continuation from the International Patent Application PCT/US19/19389 filed on Feb. 25, 2019 and now published as WO 2019/168779, which claims priority from and benefit of the U.S. Provisional Patent Application No. 62/635,804 filed on Feb. 27, 2018. The disclosure of each of the above-identified patent applications is incorporated herewith by reference.

STATEMENT REGARDING FEDERALLY SPONSORED RESEARCH OR DEVELOPMENT

This invention was made with government support under Grant No. 1640329 provided by the National Science Foundation. The government has certain rights in the invention.

TECHNICAL FIELD

The present invention relates generally to methodologies of spatially-redirecting a beam of light with respect to the original direction of propagation of such beam and, in particular, to methodologies that effectuate a change in a direction of propagation of light from the chosen initial beam of light by an angle up to 4 pi steradians.

RELATED ART

For the purpose of implementing beam steering, the use of light-switching based on the use of a spatial light modulator (SLM) and/or a phase-delay array (PDA) are particularly interesting, because these technologies present a possibility of non-mechanically steering a beam of light. As such, they are not prone to mechanical failure due to, for example, fatigue; they are faster, lighter, and more compact than other techniques. These advantages make SLM/PDA-based switches attractive for various applications such as optical switching, free space optical communication, and LIDAR, to name just a few.

Beam steering with the use of an SLM is accomplished by configuring the SLM according to the parameters of a chosen diffraction grating (that is, positioning the individual reflectors of the SLM to form a diffraction pattern on the SLM). (In comparison, what is utilized in the case of a PDA is the change of the relative phase of the different emitters.) If only angular deviation (redirection) of the incident beam is required, the pattern can be reduced to a diffraction grating. More complex spatial-transformation operations can also be performed—such as beam focusing, de-focusing, multiplexing, or correction of aberrations—with the use of a computer-generated diffraction pattern, or hologram, for example.

The laws of diffraction, particularly the Bragg law, dictate that the angle of diffraction $\theta_B$ of light at a wavelength $\lambda$ (in one case, the light incident onto the SLM or emitted from the PDA) be reciprocal to the spatial frequency of the diffraction grating. This dependency can be expressed as $$\sin\theta_B = \frac{\lambda}{(2\Lambda)}, \quad (1)$$

where $\Lambda$ is the period (pitch) of the diffraction grating.

The maximum angle of deviation of the light beam incident onto the SLM/PDA corresponds to the situation when the SLM/PDA is configured to operate as a binary grating. For example, for a typical SLM/PDA pixel pitch value of 4 microns, the corresponding binary grating has an 8 micron pitch (or has a parameter that can be described and referred to as a "line density" of 125 lines per mm). For a beam with a wavelength of 1550 nm (used for C-band telecommunications), the maximum diffraction angle therefore is about 5.5 degrees.

A skilled artisan will readily appreciate that for some applications—such as free space optical telecommunications or LIDAR, for example—the deviation of the originally-directed beam at such angle is not nearly large enough.

The use of blazed gratings may be preferred to effectuate the beam steering procedure, because the diffraction efficiency of such gratings is much higher than that of the binary gratings. Generally speaking, a blazed grating has a saw-tooth profile and requires a higher spatial density of the grating "rulings" or "grooves" (in terms of the pixels of the SLM/PDA this translates to a higher number of pixels per emitter to be resolved by the SLM/PDA).

The equation governing the diffraction efficiency $\eta$ as a function of the number of discrete levels N used to reproduce the saw-tooth function is $$\eta = \mathrm{sinc}^2\left(\frac{1}{N}\right) \quad (2)$$

Figure 1:
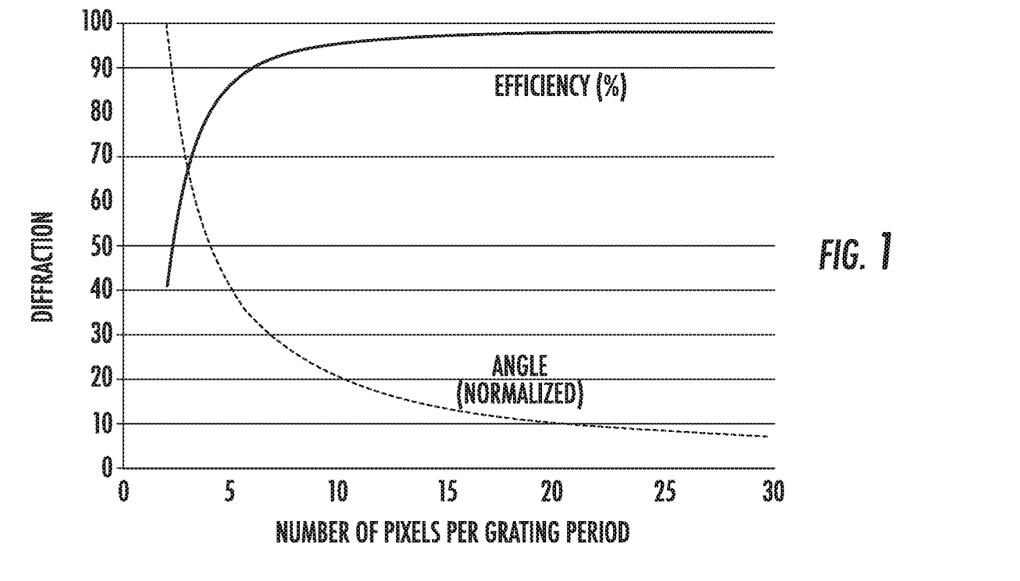
FIG. 1: Plots representing diffraction efficiency and normalized diffraction angle as a function of a number of pixels per period of a diffraction grating formed at the SLM-type device.

It can be seen from FIG. 1, where the curves represented by the Eqs. (1) and (2) are plotted simultaneously, that when the number of SLM pixels defining a given diffraction grating increases, the diffraction efficiency increases, but the diffraction angle is reduced.

The present invention relates to methodologies employed to amplify (or increase, or widen, or expand) an angle (at which a substantially-collimated light beam, incident onto the SLM/PDA-type device, has been initially diffracted by an SLM/PDA) to increase the angle at which such beam propagates while, at the same time, substantially conserving or preserving the degree of collimation of the light beam.

SUMMARY

Embodiments of the invention address the problem of reversing the direction of propagation of a beam diffracted at a spatial light modulator device.

To implement such a solution, embodiments of the invention provide an optical system that comprises a PAB-lens defined as a combination of a lens element and at least one holographic layer carried on an optical surface of the lens element. (Such system may be configured to operate as a part of a free-space optical telecommunications system or as a part of a LIDAR.) In a related case, the PAB-lens includes the lens element having a first holographic layer carried on the first optical surface of the lens element and a second holographic layer carried on a second optical surface of the lens element. In any implementation, the optical system may be equipped with a phase-type scanning light modulator (SLM) device in optical communication with the PAB-lens such that a working surface of the SLM device is facing a first optical surface of a lens element of the PAB-lens. Here, the first optical surface is a substantially planar surface, the first optical surface has a first area, and the working surface has a working area. (In one specific case, the working area may be smaller than the first area and/or a surface area of the first holographic layer may be smaller than the first area. In substantially any implementation, the optical system is configured to satisfy at least one of the following conditions: a) the working surface is in contact with the first holographic layer, and b) an area of the first holographic layer is smaller than the first area. Substantially in any implementation, the second holographic layer is dimensioned to cover and be in contact with the second optical surface of the lens element substantially at every point thereof. Alternatively or in addition, substantially in any embodiment at least one of the following conditions is satisfied: i) the lens element is configured as a large spherical cap, and ii) the working area is smaller than the first area.

Embodiments further provide a method for propagating light through an optical system. The method includes the following steps, each of which is performed while substantially preserving a degree of collimation of substantially-collimated light: (i) directing the first substantially-collimated beam of light in a first direction onto a PAB-lens, the PAB-lens including a lenslet, a first holographic layer juxtaposed with a first surface of the lenslet, and a second holographic layer juxtaposed with a second surface of the lenslet; (ii) transmitting the first substantially-collimated beam of light through the first holographic layer and through the first optical surface to form a second substantially-collimated beam of light while avoiding a total internal reflection (TIR) of light from said first substantially-collimated beam of light at an interface formed by the first holographic layer and the first optical surface; (iii) transmitting the second substantially-collimated beam of light through the second optical surface of the lenslet; and (iv) as a result of transmitting the second substantially-collimated beam through the second holographic layer, forming an output beam of light propagating in a second direction that is different from the first direction.

While an embodiment of the method is being carried out, at least one of the following conditions is satisfied: a) the first optical surface is substantially planar; and b) the step of forming the output beam of light includes forming the output beam of light propagating across a plane that is tangential to a surface of the first holographic layer. Substantially in any implementation of the method, the first optical surface may be dimensioned to be substantially planar and the step of forming the output beam of light may include causing the output beam of light to propagate such as to cross an axis that is normal to the first optical surface. Alternatively or in addition, the first optical surface is bound by a circle, and a normal to the first optical surface passes through a center of the circle. In one specific case, essentially in any implementation of the method, at least one of the following conditions may be satisfied: (i) the first optical surface is a substantially planar surface, an area of the first holographic layer is a working area, an area of the first optical surface area is a first area, wherein the first area is larger than the working area; and (ii) a perimeter of the first optical surface is a circle.

Substantially in any implementation of the method, in a special case the lenslet may include a large spherical cap, and the second holographic layer may be configured to remain in contact with the second optical surface substantially at every point thereof. Alternatively or in addition, an embodiment of the method may further comprise forming the first substantially-collimated beam of light as a result of any of (a) impinging a beam of light from a source of light onto a surface of a phase-type spatial light modulator (SLM) device; and (b) emitting the first substantially-collimated beam of light from a phase-delay array (PAD) device.

Essentially any implementation of the method of the invention may additionally include a step of changing a direction of the first substantially-collimated beam of light towards the PAB-lens to vary an angle of incidence of the first substantially-collimated beam of light onto the first holographic layer. Alternatively or in addition, essentially in any implementation of the method of the invention at least one of the (i) transmitting the first substantially-collimated beam of light through the first optical surface, and (ii) transmitting the first substantially-collimated beam of light through the second optical surface, may include transmitting said beam of light through an optical surface that carries a holographic layer thereon in contact with said optical surface.

Related embodiments further provide a method for changing a direction of propagation of a first light beam, received from a phase-modulator, in comparison with and from a first direction that is defined by a first vector. Such method includes transmitting light from the first light beam through a device that include a lens element sandwiched between first and second material layers each containing a corresponding hologram and, in a specific case, additionally comprises steps of (a) diffracting the first light beam at the first hologram to form a second light beam propagating in a second direction defined by a second vector; (b) transmitting the second light beam through a lens element; and (c) diffracting the second light beam at the second hologram to form a third light beam propagating in a third direction, the third direction defined by a third vector. Here, an angle between the first and second vectors is greater than 90 degrees. In the latter embodiment of the method, each of the steps of diffracting the first light beam and diffracting the second light beam includes diffracting a corresponding light beam at multiple holographically-defined optical diffractive elements that are spatially-multiplexed in a corresponding hologram from the first and second holograms. Substantially in any implementation of the method, the step of transmitting the second light beam may include transmitting the second light beam through the lens element configured as a spherical cap, where the angle is at least 180 degrees. Substantially in any implementation of the method, the step of diffracting the second light beam may include diffracting the second light beam at the second hologram contained in a holographic layer with first and second surfaces, each of the first and second surfaces having a constant radius of curvature. Substantially in any implementation of the method, the step of diffracting the second light beam may include diffracting the second light beam at the second hologram contained in a holographic layer carried on a substantially spherical surface of the lens element and in contact with said spherical surface of the lens element at every point thereof.

Alternatively or in addition, the specific embodiment of the step of transmitting the second light beam may include transmitting the second light beam through an optically transparent component configured as large spherical cap. The method may yet additionally include a step of irradiating the phase modulator with light and operating the phase modulator to diffract light incident upon it.

BRIEF DESCRIPTION OF THE DRAWINGS

The idea and scope of the invention will be more fully understood by referring to the following Detailed Description in conjunction with the not-to-scale Drawings, in which, to the degree possible, similar elements are indicated with the similar numbers and labels, and in which:

FIG. 6A: A diagram of a specific configuration configured to allow operational access of the largest solid angle (at least up to $4\pi$ sr) during the process of "expansion" of the angle at which the light beam propagates after the interaction with the SLM/PDA device. Here, the beam diffracted by the SLM/PDA is judiciously pre-dispersed by the first holographic layer (referred to as a pre-disperser), then enters a lens element (shown to have a truncated spherical body) coated with a material layer dimensioned as a shell in contact with the curved surface of the lens element. The materials shell is judiciously structured to operate as a second holographic layer (referred to as a disperser) that additionally diffracts the beam, thereby increasing the overall angle of deviation of the beam propagation from the initial angle of propagation of such beam.

Generally, the Drawings provide schematic depictions only, and the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

A problem of inability of steering a beam of light with a non-mechanical device beyond a range of angles of a couple of degrees (and inapplicability of such non-mechanical device for the purpose of steering the beam within a range of angles exceeding several degrees) is solved by employing a lens element or a lens system, each of the outer optical (or optically-useful) surfaces of which are juxtaposed with or against a corresponding holographic layer.

Notably, the technical description below is referencing schematic diagrams presenting the propagation of light beams in a chosen plane containing an axis parallel to a normal drawn with respect to a discussed surface of incidence (for example, an axis substantially perpendicular to the front surface of the first material layer containing a hologram). According, the discussed angles are planar angles, measured in a plane of the corresponding schematic diagram. It is understood by a person of skill in the art that this simplification addresses, effectively, a projection of the more general case of propagation of light in 3D space and that, due to the consideration of symmetry, the discussed planar angles are easily generalized to the spatial (3D) solid angles, measured in steradians.

General.

For the purposes of present disclosure, and unless expressly stated otherwise, the terms "light" and "optical" are used in their most general meanings as referring to an electromagnetic wave regardless of its wavelength (for example, regardless of whether the wavelength corresponds to visible optical range or not). The meaning of the term "hologram" is that commonly accepted in the field of physics and optical sciences, and generally refers to and implies an interferometric pattern (~pattern of interference) produced by a spatially-split coherent beam of radiation (such as a laser beam) or a three-dimensional reproduction or recording of such pattern of interference.

The term "holographic layer" or a similar term refers to a layer or stratum of optically-transparent material containing a hologram recorded therein. A layer of an appropriately-chosen photosensitive material (such as, for example, photopolymer, dichromated gelatin, photo thermorefractive glass) the distribution of index of refraction of which is modified such that the layer acts (in a Bragg regime of diffraction) on light incident on such a layer, provides but one non-limiting example of a holographic layer. The term "lens element" refers to and defines a single, individual lenslet (in comparison with terms "lens" or "lens system", either of which denotes a system that may include multiple lens elements or lenslets).

A combination of a lens element and a holographic layer juxtaposed with the lens element (so as to be either in physical contact with an optical surface of the lens element, that is to be adjoining or contiguous with such optical surface; or so as to be separated from the lens element with an air gap or at least one optical material and to not be in physical contact with the optical surface) is referred to and is defined as a PAB-lens. When a layer of material is carried on a given surface, such layer is considered to be disposed directly on such surface or on an auxiliary layer of material that is disposed directly on such surface.

The term "spherical cap" is defined as and refers to a portion of a sphere cut-off from the sphere by one, single plane. The height of the spherical cap is defined as a distance equal to the largest value of thickness of the spherical cap measured perpendicularly to the planar surface of the spherical cap.

If the sphere-cutting plane passes through the center of the sphere, so that the height of the cap is equal to the radius of the sphere, the spherical cap is referred to as a "hemisphere". The terms "small spherical cap" and "large spherical cap" refer, respectively, to spherical caps the heights of which are smaller than the radius of the sphere and larger than the radius of the sphere. Accordingly, the center of the sphere from which the large spherical cap was formed is contained within the large spherical cap.

Examples of Solutions.

One possible solution for increase of angular coverage provided by a beam arriving from (and upon the reflection from) the SLM/PAD is to use either spatially-stacked or spatially multiplexed holograms. A very specific example of a hologram appropriate for such purpose is represented by a Bragg grating. A transmissive Bragg grating can be implemented as a volume hologram that is highly operationally-selective (for example, with respect to the angle of incidence of light onto such grating): only light incident onto a given grating at a particular incident angle (and within a well-defined band of angles) is diffracted in another direction (~the direction of diffraction) by such diffraction grating (subject to a limitation that the grating extends substantially in a plane). Light that is incident at other angles that are outside the predetermined band of angles is passing through the grating substantially unaffected by diffraction, maintaining its direction of propagation.

In current context, gratings are a subset of holograms where the modulation of the refractive index of the holographic is substantially contained within or along a plane (that is, is planar in a fashion similar to that represented by a wavefront of a stationary plane wave). As a skilled artisan readily recognizes, for the purposes of this disclosure, if the modulation of the refractive index of a hologram contains some curvature, the hologram cannot be referred to as a grating anymore.

As a result of superposing several Bragg gratings (or alternatively by multiplexing several Bragg gratings) into the same body of holographic material, it becomes possible to redirect the light incident onto such body at different discrete angles to other angles. The diffraction angles can be much larger than the corresponding angles of incidence, thereby making it possible to redirect light in a predetermined direction (subject to certain limitations, as discussed further below), as shown in FIG. 2.

Figure 2:
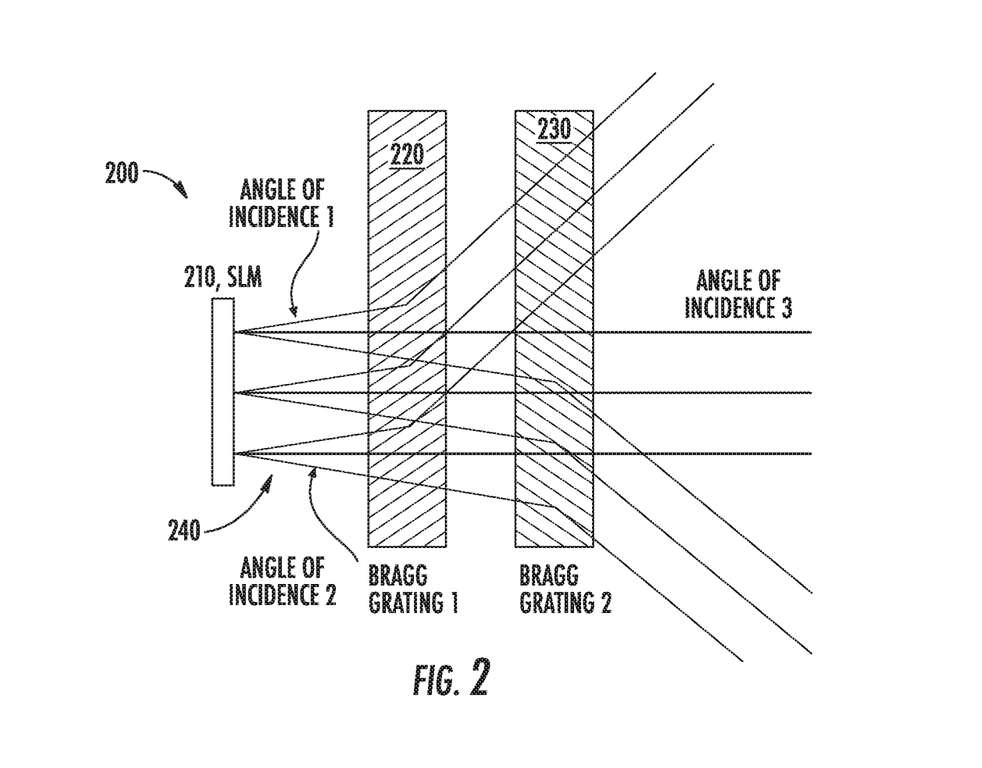
FIG. 2: A schematic diagram showing a stack of multiple Bragg gratings used to diffract light beams incident at the stack at three different angles.

In the schematic example of FIG. 2, an optical system 200 is shown that includes an SLM-type device 210, and multiple holographically-defined Bragg gratings 220, 230 (shown separated from one another and from the SLM 200 with some distance(s)). Light 240, which has interacted with the SLM 210, is illustrated for three different angles of incidence of such light onto the first Bragg grating 210. According to idea of the invention, the overall holographic portion of the system 200 is configured to operate with and re-direct the propagation of at least as many beams of light incident upon it at different angles of incidence (from the device 210)—or, alternatively, to operate with and re-direct light incident onto it in at as many different angles of incidence—as there are distinct Bragg gratings in the holographic portion. Light incident onto the combination of Bragg gratings at other angles is transmitted through the system and not lost. (In the example of FIG. 2, the two diffractive optical elements 220, 230 affect and modify the directions of propagation of the portions of light 240 approaching these elements at the incidence angles 1 and 2, while leaving the portion of light characterized by the angle of incidence 3, at the front surface of the component 210, unaffected—and propagating through the combination of the elements 220, 230 without deviation, at a zero angle.)

Angular Selectivity. As illustrated in FIG. 2, Bragg gratings 220, 230 are spatially separated from each other and from the SLM device 210. A related embodiment could be implemented by superimposing the constituent Bragg gratings directly on top of the SLM-device 210 (that is, by bringing the individual layers containing the individual gratings 220, 230 in the example of FIG. 2 onto the surface of the phase-modulating SLM as "overlayers", by analogy with coatings).

Figure 3:
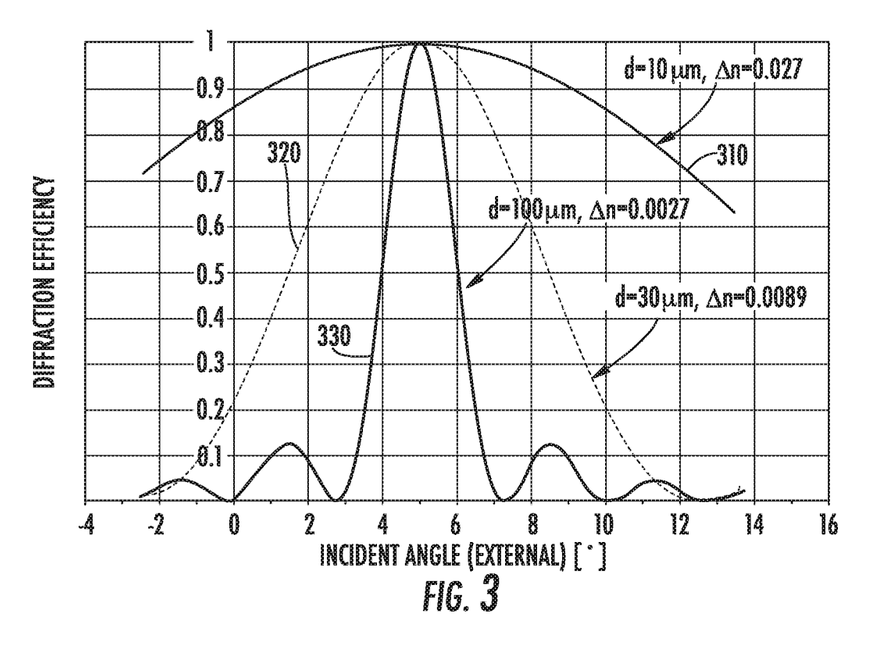
FIG. 3: Curves representing diffraction efficiencies (of three Bragg diffraction gratings of different thicknesses: 10, 30, and 100 microns) according to angles of incidence of light on such gratings.

The angular selectivity of a Bragg grating can be assessed using the Kogelnik theory of coupled-wave analysis. In a first approximation, the angular selectivity is inversely proportional to the thickness of the grating. FIG. 3 shows the plots illustrating the dependencies of diffraction efficiencies assessed, as a function of angle of incidence, for Bragg gratings with different thicknesses d (expressed in microns). In calculating these data, the Bragg angle, i.e. the angle of diffraction at which the maximum diffraction efficiency was achieved, was kept constant at 5 degrees. To accommodate for increase of the thickness of the grating (from that of 310, to that of 320, to that of 340), the index modulation $\Delta n$ was reduced proportionally.

Materials and Multiplexing. Holographic materials for recording Bragg gratings or other holograms can be chosen from photopolymers, dichromated or silver halide gelatines, photosensitized polymers such as poly-methyl-methacrylate, or various photo-thermo-refractive glasses. The preferred choice of an appropriate material would be defined by a high transparency, a high amplitude and/or contrast of available refractive index modulation (for multiplexing purposes), and the ability to be manufactured with large thicknesses, if required (hundreds of microns to millimeters) to provide for a narrow angular selectivity of light incident on the hologram.

When implementing the superposition of many Bragg gratings in a single holographic layer, the combination of the stacked gratings is likely to be limited by the optical absorption of the material as well as Fresnel reflection at each optical interface (the latter can be mitigated with the use of anti-reflection coatings).

An alternative to the aggregating or stacking of several Bragg gratings, shown in FIG. 2, is multiplexing of the gratings. (Multiplexing refers to the process and result of the recording of different holograms inside the same volume (layer). The multiplexing causes the advantageous reduction of the overall thickness of the grating combination to the thickness of a single holographic layer, which, depending on the use of particular materials, may be only a few millimeters at most.)

The multiplexing of the gratings would also facilitate avoiding multiple dielectric/material interfaces between the otherwise spatially-separated holograms. As a person of skill in the art will readily understand, the practical limitation to multiplexing is caused by the dynamic of the index modulation of the material that needs to support multiple recording.

Efficiency. General equations of diffraction efficiency derived from the Kogelnik coupled wave analysis are as follows:

$$\text{(for a hologram operating in transmission):} \quad \eta = \sin^2\left[\frac{\pi \Delta n d}{\lambda \cos\theta_i}\right] \quad (3a)$$

$$\text{(for a hologram operating in reflection):} \quad \eta = \tanh^2\left[\frac{\pi \Delta n c t}{\lambda \cos\theta_i}\right] \quad (3b)$$

In the case of small values, sin and tan h functions are substantially reduced to the values of their arguments. For a fixed maximum value of index modulation, $\Delta n_{max}$, each of the N hologram is utilizing in practice only a fraction of the available refractive index modulation: $\Delta n = \Delta n_{max}/N$. In addition, the thickness d of the material component containing a hologram is kept constant at the optimum value for a single hologram. Considering all these conditions, as a usual rule of thumb the efficiency $\eta$ of multiplexed holograms can be assessed, based on Eqs. (3a) and (3b), as:

$$\eta \propto N^{-2} \quad (4)$$

However, in more general cases, these conditions are not well met, and it is possible to achieve maximum efficiency (close to 100%) for a large number of the spatially-multiplexed holograms. This is carried out by increasing the thickness d of the material of the holographic layer while, at the same time, keeping the index modulation substantially constant. In such a case, the optical path difference (Δn·d) is conserved as well as the diffraction efficiency (as expressed by Eqs. (3a) and (3b)).

Angular multiplexing of a large number of holograms (hundreds or thousands of holograms, for example) has been previously discussed in the art related to holographic data storage.

Notably, however, as a person of skill will readily appreciate, the use of multiplexed holograms for the purposes of enlargement of the overall diffraction angle associated with the use of an SLM/PAD is ultimately limited by the effect of total internal reflection (TIR) of a diffracted beam. Indeed, at high angles of diffraction, the diffracted beam that has entered the holographic layer does not exit the material of the holographic layer anymore and is trapped between its interfaces, as shown schematically in FIG. 4. Here, light 440 is shown incident onto the spatially-multiplexed diffraction gratings (recorded in a body of holographic material 450) after the interaction with the SLM-device 210, at difference angles. The first portion of light 440, incident onto the element 450 at the first angle of incidence, is diffracted within the body 450 by a corresponding diffraction grating at an angle that satisfies the TIR condition. Accordingly, the diffracted beam 452 continues to propagate (be channeled) through the substantially-planar material layer 450

Figure 4:
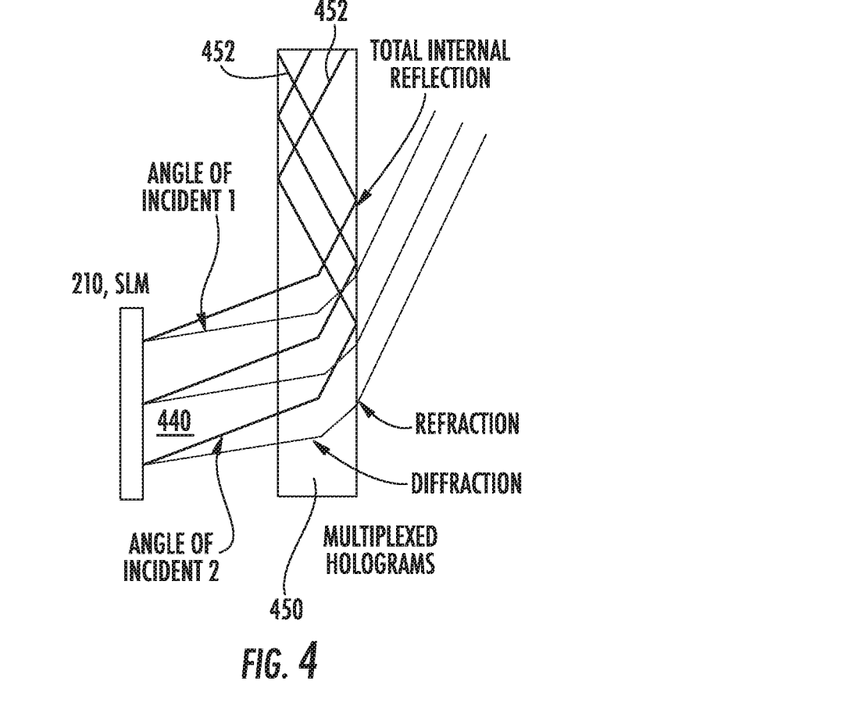
FIG. 4: A schematic diagram illustrating that a degree of modification of the angle of diffraction of light (incident onto the SLM device configured as a diffraction grating) that can be achieved with the use of total internal reflection (TIR) in a holographic layer, is numerically-limited.

The condition for the angle of the TIR, $\theta_c$ is:

$$\theta_C = a\sin\left(\frac{n2}{n1}\right), \quad (5)$$

where $n_1$ is the index of refraction of the material in which a given hologram is recorded, and $n_2$ is the index of refraction of the surrounding medium in which the holographic layer held or present.

For many practical applications, $n_2$ is air with an index of 1, and the index of refraction of most holographic recording materials is around 1.45, thereby resulting in a critical angle of about 43 degrees inside the material of the holographic layer. By definition, the critical angle outside the material of the holographic layer is 90 degrees, as a result of which the maximum solid angle to which the combination of the SLM with a juxtaposed holographic layer can expand the diffraction angle associated with the operation of the SLM is $2\pi$ steradian.

(1) Examples of Embodiments Employing PAB-lens with a Holographic Layer on the Front (Inner) Surface of the Constituent Lenslet.

It is appreciated from the discussion presented above that, in order to increase the solid angle accessible by the beam-steering device, the TIR for light propagating inside the holographic layer with a hologram recorded in it has to be avoided.

Figure 5:
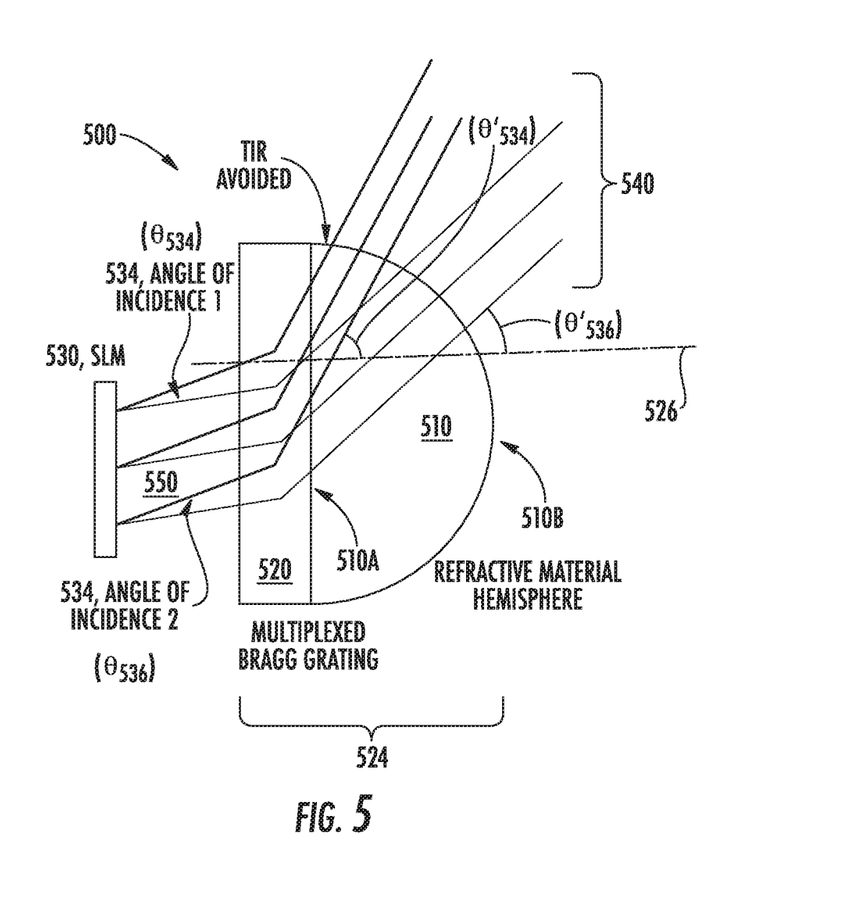
FIG. 5: A diagram illustrating that the expansion-of-an-angle-limiting TIR condition at the holographic material interface for a large diffraction angle can be avoided with the use of a refractive optically-transparent lenslet.

Example 1. According to the idea of the invention, the problem of avoiding the TIR (of light diffracted at the holographic grating in the holographic material layer) in such material layer is solved by implementing a refractive optically-transparent lenslet 510 (or a combination of lenslets, in a more general case) in optical communication with (and more specifically, in optical and physical contact with) the substantially planar holographic layer 520 (containing at least one hologram, configured as a diffraction grating, recorded in the layer) to form, together with the layer 520, a lens 524 that is referred to as a PAB-lens. The first optical surface 510A of the lenslet 510 is facing (and is in contact with) the holographic layer 520, as is schematically shown in FIG. 5. Notably, while FIG. 5 illustrates the idea, according to the principle of the invention the use is made of a lenslet 510 one outer surface of which is substantially congruent with a surface of a sphere. (In a specific case, the lenslet 510 can be dimensioned to be a hemispherical lens element; in a more general case, which is within the scope of the invention, the lenslet 510 can be sized and/or dimensioned differently.) In a preferred configuration, the spatial function representing the second optical surface 510B of the lenslet 510 is differentiable (that is, has a second derivative) at any point of the second surface and therefore free from (devoid of, does not contain) spatial "kinks".

As shown in FIG. 5, the system 500 includes, in addition to the PAB-lens 524, the phase modulator 530. The spatial coordination of the PAB-lens 524 and the phase-modulator 530 is such that the holographic layer 520 is spatially-separated from the phase modulator element 530 (either an SLM-device or a PDA-device). This allows for a clear illustration of the direction of the beams 534, 536 arriving to the front surface 520A of the layer 520 from the device 530.

Example 2. In a related embodiment (not shown), the system 500 may be configured as a combination (a stack) of the SLM/PDA 530, the holographic layer 520, and the lenslet 510 directly on top of each other, with physical contact between the immediately neighboring elements. In this specific case, the dimensions of the hologram-containing layer 520 and the lenslet 510 may be similar to the diameter of the light beam 550 arriving at the layer 520 from the device 530. This configuration may be preferred in some cases requiring the miniaturization the overall system 500, as it facilitates the reduction of the number of optical interfaces at which light may be lost during propagation through the system 500. The angles of incidence of the beams 534, 536 onto the surface 520A are denoted, with respect to the axis 526, which is normal to the surface 520A, as angle of incidence 1 (or $\theta_{534}$) and angle of incidence 2 (or $\theta_{536}$). The angles at which light in the same beams exits the outer surface 510B of the lens element 510 are denoted as $\theta_{534A}$ and $\theta_{536A}$, respectively, as measured with respect to the same axis 526. The combination of the beams 534, 536 at the exit from the surface 510B is denoted as 540.

According to an embodiment of the invention, therefore, a PAB-lens is used in combination with the SLM- or PAD-type device (configured, for example, as a phase modulator). In one implementation, the PAB-lens includes a lens element carrying on a surface thereof a holographic material layer with at least one hologram (diffraction grating) recorded in such layer. The practical use of the PAB-lens with the SLM-type device causes increase the angle of propagation of light, that has already interacted with the SLM-device, as a result of diffraction of light within the material layer followed by refraction of the so-diffracted light at an output surface of the lens element of the PAB-lens. In other words, in one embodiment the optical system of the invention includes a PAB-lens configured as a combination of a lens element and at least one holographic layer carried on a first optical surface of the lens element. (It is appreciated that such optical system may be configured to operate as a part of a free-space optical telecommunications system or as a part of a LIDAR.) In a general case, a surface of the lens element is congruent with a surface of a sphere (has a constant radius of curvature); in a specific case, the lens element may be a hemispherical lens element.

Referring again to FIG. 5, She use of the lenslet 510 may allow for larger separation (in angular space) between the internal angles of the different holograms (diffraction gratings) multiplexed inside the substantially-planar material layer 520. Indeed, while the range of internal angles without the presence of the substantially hemispherically-shaped lenslet 510 is [−TIR, +TIR] (e.g. [−43 degrees, +43 degrees]), when the lenslet 510 is present such range becomes [−90 degrees, +90 degrees]. As a result of increasing the separations between the angles of incidence of light, operably addressed and re-directed by the individual holograms multiplexed in the layer 520, the presence of the lenslet 510 causes a reduction of a crosstalk between portions or parts (shown as 534, 536) of the overall arrived-from-the-SLM beam 500, which beam portions propagate at different diffraction angles from the SLM and the PAB-lens 524 and then are diffracted at the corresponding holograms (from the multiple holograms multiplexed in the material layer 520). This crosstalk of the partial beams 534, 536 inside the holographic material layer 520 is given by the superposition of the angular dispersion energy curves of FIG. 3 for different holograms. Light incident onto the SLM 530 (that gives rise to the beams 534, 536 is not shown for simplicity of illustration).

Notably, since the component 510 is configured to operate as a lens element, the beam incident onto the phase modulator 530 (the SLM in this example) has to be corrected to remain collimated when reaching the SLM. (When the phase modulator 530 is configured as a PDA, where the beam is emitted by the PDA itself, there is no need for such a correction.)

Likewise, to avoid the aberration of the overall beam of light 540 (a composite of the light portions corresponding to the beams 534, 536 as shown) upon existing the second optical surface 510B, the holograms in the layer 520 should be recorded with a light beam possessing optical power that is opposite in sign to that of the object beam (the conjugate beam). This type of aberration correction can be implemented, for example, during the holographic recording of the holograms in the layer 520. In this case, the recorded diffraction pattern does not qualify as a Bragg grating but, instead, is understood in related art to be a volume hologram.

The above considerations are equally applicable to other embodiments presented in this disclosure.

(2) Examples of Embodiments Employing a PAB-lens with a Holographic Layer on the Outer Surface of the Constituent Lens Element.

From the discussion above person of skill in the art would readily appreciate that the use of the combination of either the spatially-stacked multiple holograms separated from one another in space (that is, holograms formed in respectively corresponding spatially-distinct holographic layers) or the spatially-multiplexed (in the same holographic layer) multiple holograms with a lens element—such as the lenslet 510, in one specific case—may lead to the condition $\theta_{534A} > \theta_{534}$; $\theta_{536A} > \theta_{536}$.

At the same time the skilled artisan would consider that the use of such combination of the optical elements may not necessarily result in increase of the solid angle defined by the multiplicity of incident angles at which light propagates through (exits from) the component 520 in absence of the lenslet 510. In other words, the addition of the lens element 510 to the layer 520 may not necessarily expand or increase the solid angle initially accessible by beam steering (via the use of a combination of the SLM 530 and a set of multiplexed holograms 520), especially in the case when the lens element 510 has a second surface 510B defined by a constant radius of curvature.

For example, the highest solid angle at which light (transmitted through the layer 520) can exit the surface 510B when the lenslet 510 is present is the same as that for light exiting (transmitting through) the layer 520 in absence of the lenslet 510, namely $2\pi$ steradian. In other words, while the addition of the lens element 510 to the layer 520 advantageously facilitates the avoidance of the TIR condition at the output interface of the layer 520 (which corresponds to the situation when the light diffracts, at the hologram of the layer 520, at an angle ≤90 degrees), the same light enters the lens 510 through the first optical surface 510A and exits through the surface 510B at the same angle that is smaller than 90 degrees.

In a related embodiment, this remaining problem of increasing the solid angle accessible by the light beam propagating from the phase modulator (whether the SLM or PDA) 530 and diffracted in the layer 520 is solved. The solution involves, among other things, adding a second holographic layer (containing a second set of holograms and interchangeably referred to herein as a disperser) to the system. For example, covering the outer surface 510B of the lens element 510 of the embodiment 500 with a second holographic layer (preferably completely; not shown) facilitates the achieving of this goal. In other words, in a related embodiment of the optical system of the invention the PAB-lens includes a lens element having a first holographic layer carried on the first optical surface of the lens element and a second holographic layer carried on a second optical surface of the lens element.

Considering the possibility of adding a second, uniformly-think holographic layer (with corresponding diffractive optical element(s) contained in it) to the surface 510B of the embodiment of FIG. 5, the skilled artisan has to realize—based on the considerations discussed in reference to FIG. 4—that the maximum angle, at which light propagating through the holographic layer can exit such holographic layer, corresponds to the direction of axis that is tangential to the surface of such holographic layer. Such "exit in a tangential direction" condition is then satisfied. This tangential condition has some consequences on the geometry of the overall system. First, the initial set of multiplexed holograms (520) should be conserved to increase the angular separation of the beams inside the lens element (510). Second, in order to be able to "retroreflect" or reverse the propagation direction of a beam (in comparison with a direction in which the beam propagated when incident onto the layer 520), the shape of the lens element 510—the hemispherical shape—is not quite suitable and needs to be adjusted.

Figure 6A:
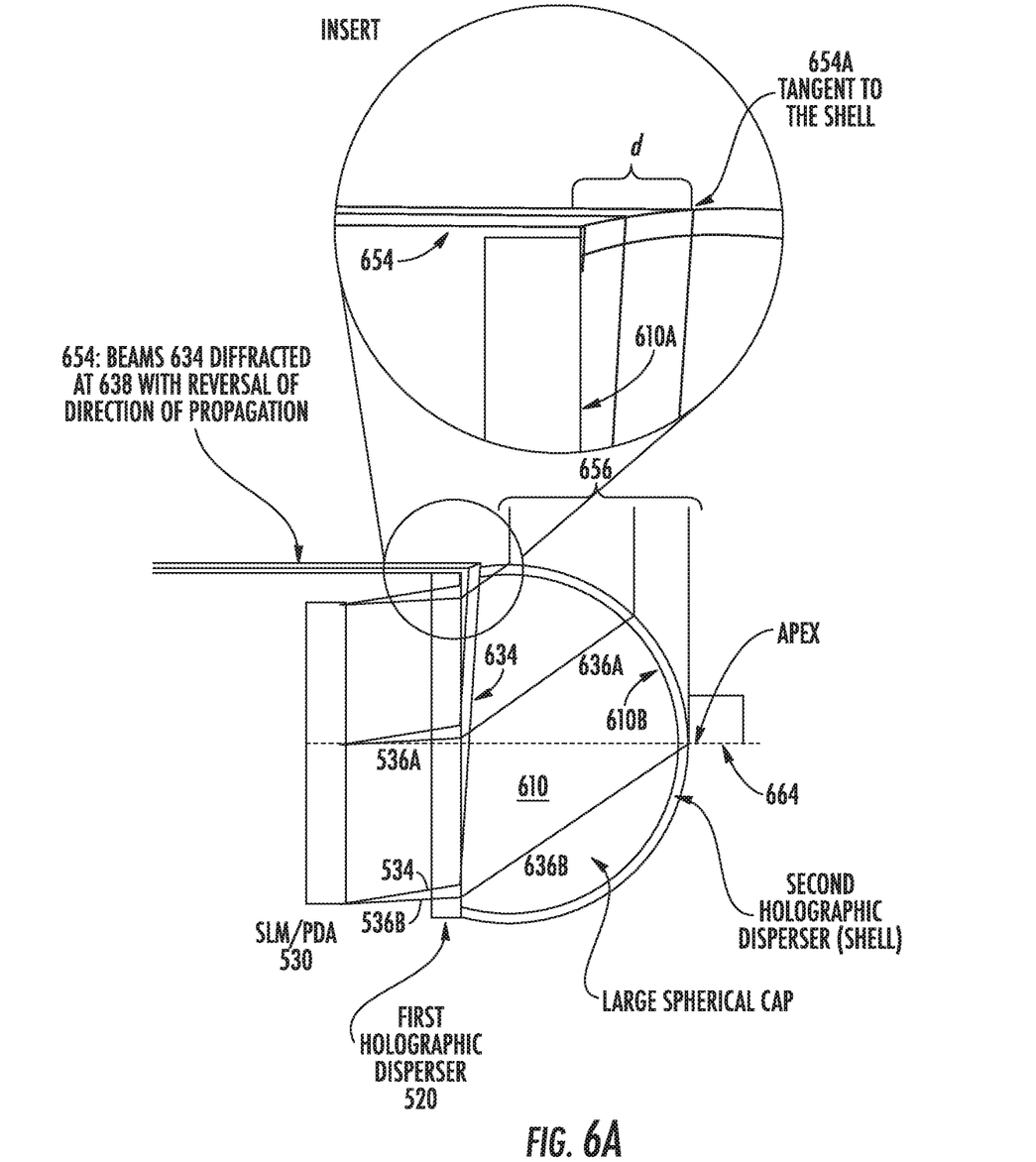
FIG. 6B: An illustration of a related embodiment of the invention.

Examples 3, 4. According to the idea of the invention, and to achieve a goal of at least reversing the direction of propagation of the beam, incident onto embodiment of the system of the invention from the SLM-device, the hemispherically-shaped lens element 510 is transformed into (or substituted with) the element 610 shaped as a large-spherical-cap, which is further equipped with and carries a second holographic layer (with spatially-multiplexed holograms in it). As will be appreciated by a skilled person, such configuration allows one to substantially reverse the direction of (or retro-direct, substantially by 180 degrees) a ray of the beam traversing the lens element 610 and the second layer 638.

The embodiment of FIG. 6A illustrates this situation: the lens element 610 is dimensioned as a large spherical cap having the first and second optical surfaces 610A, 610B. The second holographic layer 638 with the second set of holograms recorded in it is configured to diffract the beam 634, 636 propagating inside the lens element 610 at an even larger angle. This second holographic layer is shown to be in contact with the surface 610B substantially at every point of the surface 610B. As shown, the first holographic layer (the first holographic disperser 520, or pre-disperser) amplifies/enlarges solid angle within which light travels upon exiting the layer 520 into the lens element 610 as compared to the initial, incidence solid angle within which beams 534, 536 impinge on the layer 520 from the phase modulator 530. (Three rays are shown for each of the beams 534, 536. Two of such rays the beam 536 are labelled 536A, and 536B.) Upon diffraction within the first holographic layer 520, the beams 534, 536 enter the lens element 610 as beams 634, 636 and propagate through the lens element 610 towards the second optical surface 610B and then into the second holographic disperser (shell) 638 to be diffracted again in the shell and exit the shell as beams 654, 656.

As shown in the insert to FIG. 6A on a slightly enlarged scale, depending on a particular configuration of holograms in the shell layer 638, the direction of light beams 634 (representing beams 534 diffracted in the shell layer 638) may be substantially reversed as compared to the initial general direction of propagation of the beams 534 from the phase modulator 530 towards the first holographic layer 520. As a result of such reversal of the direction of propagation of a particular light beam, incident onto the first holographic layer, the overall spatial coverage provided by light distribution incident (as shown—from the phase modulator 530 onto the layer 520) is increased to 4 pi steradian.

The portion of the large-spherical-cap-sized lens element 610 and the corresponding covering it portion of the second holographic layer 638 that extend "beyond" or "overhang" the plane containing the geometrical center of the hemisphere—that is, the portions having geometrical extents denoted as "d" in insert to FIG. 6A—are judiciously dimensioned to ensure such "reversal" of direction of propagation. In one specific implementation, at least one of the beams of light 534 that diffracted twice upon propagation through the PAB-lens (in this case formed by the combination of elements 520, 610, and 638) is diffracted, upon traversal the shell layer 636, along the optical axis 664. This is shown with one of the beams, 654A, being tangential to the substantially spherical surface of the layer 638 at a point corresponding to the diameter of the lens element 610 passing through the geometrical center of the sphere defining such spherical surface.

FIG. 6A illustrates the case when the first holographic layer or pre-disperser 520 is spatially separated from the SLM/PDA element 530 to better show the direction(s) of propagation of the beams 534, 536. However, in a related practical embodiment (not shown) it may be preferred to have the SLM/PDA 530, the first holographic disperser (pre-disperser) 520, and the large-spherical-cap-shaped lens element 610 directly on top of each other, in physical contact with one another. (If so configured, the diameter of the hologram in the layer 520 and the flat surface 610A may be dimensioned to be similar in size to the diameter of the beam. This configuration is preferred because it reduces the overall size of the system and reduces the number of optical interfaces responsible for loss of light.)

Figure 6B:
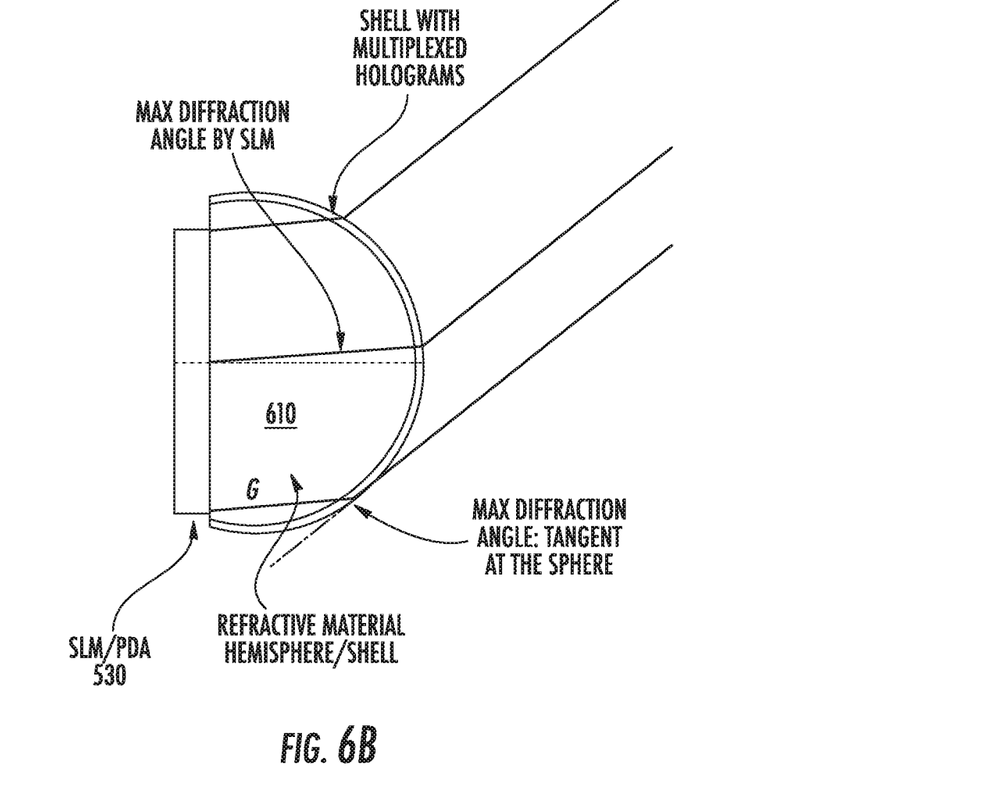

FIG. 6B illustrates a related implementation, where the lens element 610 is shown in direct contact with the SLM/PDA 530 and where the overall system does not contain (is devoid of or without) the first holographic pre-dispersion layer 520 while still in direct contact with the second holographic layer 638. It can be seen, that since the maximum diffraction angle afforded by the operation of the SLM/PDA 530 is small, the lower portion of the (shown to be rather wide) beam 636, illustrated by the ray G and propagating through the body of the element 510 limits the maximum angle of diffraction at the layer 638 such that the beam is tangential to the outer (substantially spherical) surface of the layer 638 at the point at which the ray G exits the layer 638. To be able to diffract at least a portion of the beam 636 at larger angle, the lower part G of the beam should intersect the surface 610B closer to the apex point where, and only where, it would be able to be diffracted at 90 degrees. (Accordingly, the body of the lens element 610 is sized as a large spherical cap to extend (be present) beyond the plane containing a geometrical center of the sphere from which lens element 610 originates, thereby increasing the overall volume of the system.)

Figure 7A:
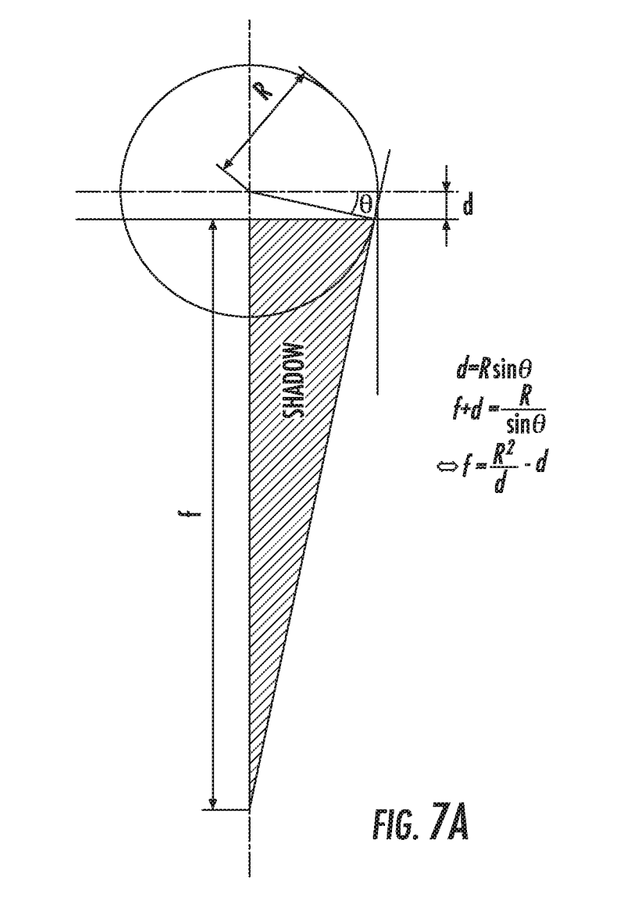
FIGS. 7A, 7B provide additional illustrations representing the operation of an embodiment of the invention.
Figure 7B:
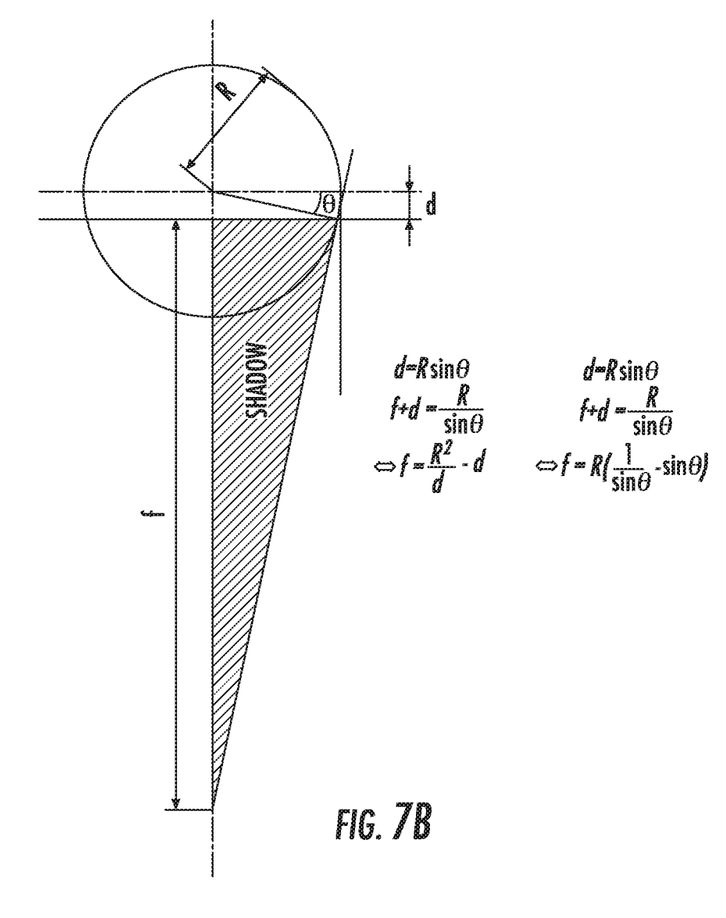

Example 5. In yet another specific embodiment—depending on the particular combination of at least the geometrical parameters of the large spherical cap lens element 610, thickness of the shell holographic layer 638, and corresponding material indices—at least some of the beams 534 initially entering the system of the invention are redirected not only "backwards" but even beyond that at such an angle that they (upon being redirected "backwards") eventually intersect the optical axis 664 on the other side of the phase modulator 630. This is schematically illustrated in FIGS. 7A, 7B, which evidence that a specific implementation of the idea of the invention results in amplification or increase of the solid angle, accessible with light arriving from the phase-modulator such as an SLM or a PDA, beyond $2\pi$ steradian and up to (and inclusive of) $4\pi$ steradian. For simplicity of illustration, neither of the pre-disperser and disperser holographic layers 520, 638 covering respectively the planar input surface of the lens element and the curved, congruent with a surface of a sphere output surface of the lens element of the structures of FIGS. 7A, 7B.

The embodiment(s) of the system similar to that schematically shown in FIGS. 7A, 7B, is judiciously devised to diffract light, arriving at the substantially-flat surface of the lens element 610 from the SLM 530 (not shown) for each of the following cases (see FIGS. 8A, 8B, 8C, and 8D):

Case 1: Change of the initial direction of propagation of light by 0°. See FIG. 8A. The light is not diffracted by the SLM. The light is incident at 90° with respect to the planar surface of the first dispersor 520 and is not diffracted by the first dispersor; then the light propagates inside the large-spherical-cap-sized lens element 610 to be diffracted by the shell hologram 638 to compensate for the refraction caused by the element 610 and to form a collimated beam.

Case 2: Change of the initial direction of propagation of light by about 90°. See FIG. 8B. The light is diffracted by the SLM at an angle of e.g. 1°. (To obtain this angle of diffraction, the grating pitch of the SLM can be calculated based on the Bragg law.) The so-diffracted at the SLM light is incident at about 89° (90°-1°) onto the first dispersor 520. The first dispersor diffracts light at 45° and transmits light that further propagates inside the large-spherical-cap-sized lens element 610. The element 610 refracts the beam(s) but the collimation is restored as a result of diffraction at the shell hologram 638 that also diffract the beam at 90° with respect to the original direction of propagation.

Case 3: Change of the initial direction of propagation of light by about 180° (reversal of direction of propagation). See FIG. 8C and/or FIG. 6A.

Case 4: Change of the initial direction of propagation of light by an angle exceeding 180°. See FIGS. 7A, 7B, 8D. The light is diffracted by the SLM at an angle of e.g. 2.5°. (To obtain this angle the grating pitch of the SLM device can be calculated based on the Bragg law.) The light is then incident at about 87.5° (90°-2.5°) onto the first dispersor

520. The first dispersor 520 is configured to diffract the light on transmission such that the outermost ray of the beam is incident onto the curved outer surface of the large-spherical-cap lens element at a point corresponding to the "overhang" portion that extends the hemisphere to the large-spherical-cap shape. For a large-spherical-cap-sized lens element of radius "R" (that is, the sphere that has been truncated at a distance "d" from its center, see FIG. 6A), the angle of diffraction from the first dispersor "θ" should be at least that defined by tan (90-θ)=d/R. For example, for a sphere of 10 cm radius that has been truncated at d=1 cm from its center, the diffraction angle at the diffractive element contained in the first dispersor 520 should be at least 84.2° to be able to achieve a diffraction at 180° with the diffractive optical element contained in the second holographic layer 638. In this case, the distance "f" at which the beam will intersect the horizontal line passing through the center of the sphere is given by:

$$f = \frac{R^2}{d} - d \quad (6)$$

Here, the large-spherical-cap-sized lens element refracts the beams but their collimation is restored by the diffraction at the layer 638 that also diffracts the beam at an angle exceeding 180°.

In terms of guidelines to practical implementation of the embodiments of FIGS. 6A, 7A, 7B, and in addition to example(s) of material/system parameters provided elsewhere in this disclosure, one can consider the following: (A) SLM 530: Holoeye Pluto; resolution of 1920×1080; Pixel Pitch: 8.0 μm; Fill Factor: 93%; Active Area 15.36×8.64 mm² (0.7" Diagonal; Addressing 8 Bit (256 Grey Levels); Signal Formats DVI—HDTV Resolution; Input Frame Rate 60 Hz. (B) First dispersor (pre-dispersor 520): Material: PQ/PMMA; thickness 2 mm; Angular selectivity: 0.05° FWHM; active area—the same as that of SLM 15.36×8.64 mm². (C) Second dispersor, 638: two diffraction gratings configured to cover input angles within the range of +/−80 deg and provide for diffraction angles within the range of +/−150 deg; Material: Bayfold photopolymer.

Notably, most holographic materials are liquid or viscous before exposure, and can be coated on a curved surface (such as the second optical surface 610B) to form a shell layer 638. In the specific case when PTR glass (which is a solid holographic recording material) is used for fabrication of the embodiment of FIG. 6A, the entire lens element 610 itself can be made of this material.

In a specific embodiment related to that of FIG. 6A, which is devoid of a pre-disperser layer 520, the lens element can be simply replaced by the layer 638 since there is no TIR created at the interface between the layer 520 and the lens element.

Alternatively or in addition, and in both the embodiment of FIG. 6A and the embodiment of FIG. 6B, each of the beams of light that has propagated through the overall system—for example, the beams of light 654, 656 of FIG. 6A) are illustrated to remain substantially collimated upon light propagation through the second holographic layer 638. Such effect is intentionally achieved by the appropriate design of the individual diffraction gratings of the holographic layer 638, which are configured to compensate the optical lensing effect (converging and/or diverging of light propagating through the element 610) with diffraction of light in the layer 638. In other words, to correct for any type of unwanted aberration introduced by the curvature of the optically-useful surface(s) and refractive index of the large-spherical-cap-shaped lens element 610, the hologram(s) carried in the shell layer 636 can be recorded with the judiciously chosen conjugate beam.

The embodiments of this invention are useful for, but not limited to, non-mechanical beam steering in various applications such as free-space optical communication, beam switching, LIDAR scanning, and maskless lithography.

The invention as recited in claims appended to this disclosure is intended to be assessed in light of the disclosure as a whole. Various changes in the details, steps and components that have been described may be made by those skilled in the art within the principles and scope of the invention.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +1-5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:

1. An optical system comprising a PAB-lens that includes a lens element that is dimensioned as a spherical cap and that has a non-zero optical power and at least one holographic layer carried on a first optical surface of the lens element, the optical system configured to form, upon transmission of a substantially collimated input beam of light incident onto the at least one holographic layer through the first optical surface of the lens and a second optical surface of the lens, a substantially collimated output beam of light propagating in a direction that differs from an initial direction of propagation of a substantially collimated input light by at least 180 degrees.

2. An optical system comprising:
a PAB-lens that includes a lens element that has a non-zero optical power and that is configured as a large spherical cap, the lens element having a first holographic layer carried on a first optical surface of the lens element and a second holographic layer carried on a second optical surface of the lens element;
a phase-type scanning light modulator (SLM) device in optical communication with the PAB-lens, wherein a working surface of the SLM device is facing the first optical surface of the lens element of the PAB-lens, wherein the first optical surface has a substantially planar surface and a first area, and wherein the working surface has a working area;
wherein the optical system is configured to form, upon a transmission through the second holographic layer, a substantially collimated output beam of light propagating in a direction that differs from an initial direction of propagation of a substantially-collimated light incident from the SLM onto the first holographic layer by at least 180 degrees.

3. The optical system according to claim 2, wherein at least one of the following conditions is satisfied:
a) the working area is smaller than the first area, the working area and the first area being dimensioned such that substantially all input light incident in operation of the optical system on the SLM and steered by the SLM within the steer angle falls onto the first area; and
b) an area of the first holographic layer is smaller than the first area, the area of the first holographic layer being dimensioned such that all light incident onto the first holographic layer from the SLM within the steer angle is transmitted through the first optical surface.

4. The optical system according to claim 2,
wherein at least one of the following conditions is satisfied:
a) the working surface is in contact with the first holographic layer and,
b) an area of the first holographic layer is smaller than the first area.

5. The optical system according to claim 2,
wherein
the working area is smaller than the first area, and
wherein the optical system in configured to transmit a substantially-collimated beam of light, incident onto the SLM along a first axis, through the SLM and the lens element and the second holographic layer and outcouple said substantially-collimated beam of light from the second holographic layer along a second axis that crosses the first axis.

6. The optical system according to claim 2, wherein the second holographic layer covers and is in contact with the second optical surface of the lens element substantially at every point thereof.

7. A method for propagating light through an optical system,
the method comprising:
while substantially preserving a degree of collimation of light:
directing a first substantially-collimated beam of light in a first direction onto a PAB-lens, the PAB-lens including a lenslet having a curved surface, a first holographic layer juxtaposed with a first surface of the lenslet, and a second holographic layer juxtaposed with a second surface of the lenslet;
transmitting the first substantially-collimated beam of light through the first holographic layer and through the first optical surface to form a second substantially-collimated beam of light while avoiding a total internal reflection (TIR) of light from said first substantially-collimated beam of light at an interface formed by the first holographic layer and the first optical surface;
transmitting said second substantially-collimated beam of light through the second optical surface of the lenslet;
and
as a result of transmitting said second substantially-collimated beam through the second holographic layer, forming an output beam of light propagating in a second direction that is different from the first direction.

8. A method according to claim 7, wherein at least one of the following conditions is satisfied:
a) the first optical surface is substantially planar; and
b) said forming the output beam of light includes forming the output beam of light propagating across a plane that is tangential to a surface of the first holographic layer.

9. A method according to claim 7, wherein the first optical surface is substantially planar and said forming the output beam of light includes causing the output beam of light to propagate such as to cross an axis that is normal to the first optical surface.

10. A method according to claim 9, wherein the first optical surface is bound by a circle, and wherein said normal passes through a center of the circle.

11. A method according to claim 7, wherein at least one of the following conditions is satisfied:
(i) the first optical surface is a substantially planar surface, an area of the first holographic layer is a working area, an area of the first optical surface area is a first area, wherein the first area is larger than the working area; and
(ii) a perimeter of the first optical surface is a circle.

12. A method according to claim 7, wherein the lenslet includes a large spherical cap, and wherein the second holographic layer is in contact with the second optical surface substantially at every point thereof.

13. A method according to claim 7, further comprising:
forming said first substantially-collimated beam of light as a result of any of (a) impinging a beam of light from a source of light onto a surface of a phase-type spatial light modulator (SLM) device; and (b) emitting said first substantially-collimated beam of light from a phase-delay array (PAD) device.

14. An optical system comprising:
a first holographic optical element having a first hologram therein; and
a lens element dimensioned as a large spherical cap,
wherein said first holographic element is carried on a substantially spherical surface of the spherical cap in contact with said substantially spherical surface substantially at every point thereof to change an initial direction of propagation of a substantially-collimated light incident onto the optical system by a deviation angle of up to at least 180 degrees.

15. An optical system comprising:

a first holographic optical element having a first hologram therein; and a lens element dimensioned as a large spherical cap, wherein said first holographic optical element is carried on a substantially spherical surface of the large spherical cap in contact with said substantially spherical surface substantially at every point thereof and wherein a first optical surface of the large spherical cap is substantially planar and carries a second holographic optical element that has a second hologram therein, wherein the optical system is configured to change an initial direction of propagation of a substantially-collimated light incident onto the optical system by a deviation angle of up to at least 180 degrees, said deviation defined with light that has been transmitted through the second holographic optical element.

16. The optical system according to claim 15, further comprising a phase-type scanning light modulator (SLM) adjoining the first optical surface, wherein a working surface of the SLM faces the first optical surface and has an area that is smaller than an area of the first second holographic optical element to confine light from said substantially-collimated light that has impinged onto the SLM and has been steered towards the first optical surface, by said SLM in operation thereof, within limits of the second holographic optical element.

17. The optical system according to claim 15, configured to outcouple said substantially-collimated light from the output system along an axis that is tangential to an output surface of the optical system.

18. The optical system according to claim 15, configured to maintain a degree of collimation of said substantially-collimated light during propagation of said light through the optical system.

19. A light detection and ranging (LiDAR) system comprising the optical system configured according to claim 15.

20. The optical system according to claim 15, configured to change the initial direction of propagation of a substantially-collimated light incident onto the optical system by the deviation angle exceeding 180 degrees.

* * * * *